(12) United States Patent
Luo et al.

(10) Patent No.: US 7,552,175 B2
(45) Date of Patent: Jun. 23, 2009

(54) MECHANISM FOR CONTROLLING COMMUNICATION PATHS BETWEEN CONFERENCE MEMBERS

(75) Inventors: Chong Luo, ShangHai (CN); Jiang Li, Beijing (CN); Shipeng Li, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1030 days.

(21) Appl. No.: 10/837,315

(22) Filed: Apr. 30, 2004

(65) Prior Publication Data

US 2005/0256925 A1 Nov. 17, 2005

(51) Int. Cl.
G06F 15/16 (2006.01)
(52) U.S. Cl. .................. 709/205; 709/206; 709/207; 709/208; 709/209
(58) Field of Classification Search .................. 709/205
See application file for complete search history.

(56) References Cited

U.S. PATENT DOCUMENTS

| | | | |
|---|---|---|---|
| 5,764,982 | A | 6/1998 | Madduri |
| 5,862,329 | A | 1/1999 | Aras et al. |
| 5,867,653 | A | 2/1999 | Aras et al. |
| 6,167,432 | A | 12/2000 | Jiang |
| 6,496,201 | B1 | 12/2002 | Baldwin et al. |
| 6,850,985 | B1 * | 2/2005 | Giloi et al. ............ 709/230 |
| 2002/0059425 | A1 | 5/2002 | Belfiore et al. |
| 2002/0073204 | A1 | 6/2002 | Dutta et al. |
| 2002/0087688 | A1 | 7/2002 | Kamentsky et al. |
| 2002/0133611 | A1 * | 9/2002 | Gorsuch et al. ........ 709/231 |
| 2002/0143855 | A1 | 10/2002 | Traversat et al. |
| 2002/0147810 | A1 | 10/2002 | Traversat et al. |
| 2002/0152299 | A1 | 10/2002 | Traversat et al. |
| 2002/0156917 | A1 | 10/2002 | Nye |
| 2002/0184310 | A1 | 12/2002 | Traversat et al. |
| 2002/0188657 | A1 | 12/2002 | Traversat et al. |
| 2002/0188678 | A1 | 12/2002 | Edecker et al. |
| 2003/0050959 | A1 | 3/2003 | Faybishenko et al. |
| 2003/0217096 | A1 | 11/2003 | McKelvie et al. |
| 2004/0148326 | A1 * | 7/2004 | Nadgir et al. ............ 709/200 |

(Continued)

OTHER PUBLICATIONS

J. Lennox, H. Schulzrinne, "A Protocol for Reliable Decentralized Conferencing", In Proc. of 13th International Workshop on Network and Operating Systems Support for Digital Audio and Video, pp. 72-81, 2003.

(Continued)

*Primary Examiner*—Jeffrey Pwu
*Assistant Examiner*—Abdelnabi O Musa
(74) *Attorney, Agent, or Firm*—Lee & Hayes, PLLC

(57) ABSTRACT

The techniques and mechanisms described herein are directed to controlling communication paths between conference members in a decentralized multi-party conference that supports a full mesh architecture. Several check points are tested in order to handle concurrency issues and to ensure quality of service. First, a check is made to determine whether any pending communication paths exist between the two systems. Second, a check is made to determine whether one of the systems is in the process of leaving the multi-party conference. Third, a check is made to determine whether a maximum number of conference members already exist in the conference. Upon failing any of these checks, the communication path between the two systems fails. Upon success, the new system initiates the joining process with each of the other members in the conference in order to maintain the full mesh architecture.

29 Claims, 6 Drawing Sheets

U.S. PATENT DOCUMENTS

| | | | |
|---|---|---|---|
| 2005/0021617 A1 | 1/2005 | Rusitschka | |
| 2005/0086300 A1 | 4/2005 | Yeager et al. | |
| 2005/0105476 A1 | 5/2005 | Gotesdyner et al. | |
| 2005/0190273 A1 | 9/2005 | Toyama et al. | |
| 2007/0005804 A1* | 1/2007 | Rideout | 709/246 |
| 2007/0097885 A1* | 5/2007 | Traversat et al. | 370/254 |

OTHER PUBLICATIONS

Jang-Jiin Wu, et al., "Multicast Routing with Multiple QoS Constraints in ATM Networks", Information Sciences, vol. 124, No. 1-4, pp. 29-57, May 2000.

H. Sakate, et al., "Resource Management for Quality of Service Guarantees in Multi-Party Multimedia Application", Proceedings Sixth International Conference on Network Protocols (Cat. No. 98TB100256), pp. 189-196, Oct. 1998.

N. Kausar and J. Crowcroft, "End to End Reliable Multicast Transport Protocol Requirements for Collaborative Multimedia Systems", Proceedings Seventeenth IEEE Symposium on Reliable Distributed Systems (Cat. No. 98CB36281), pp. 425-430, Oct. 1998.

S. Sakata, Multimedia and Multi-Party Desktop Conference System (MERMAID) as Groupware Platform, IEEE, vol. 2, pp. 739-743, Aug. 1994.

J.S. Park et al., "A Conferencing System for Real-Time, Multiparty, Multimedia Services", IEEE Transactions on Consumer Electronics, vol. 44, No. 3, pp. 857-865, Aug. 1998.

European Search Report for Application No. EPO5103554, dated Apr. 6, 2006, 3 pages.

Toga, James and Ott, Jorg, "ITU-T Standardization Activities for Interactive Multimedia Communications on Packet-Based Networks: H.323 and Related Recommendations", Computer Networks and ISDN Systems, North Holland Publishing. vol. 31, No. 3, Feb. 11, 1999, pp. 205-223, Amsterdam, NL.

* cited by examiner

| MESSAGE TYPE | DESCRIPTION |
|---|---|
| JOIN | SENT FROM A NEW USER TO EXISTING MEMBER |
| ACCEPT | REPLY IF EXISTING MEMBER ACCEPTS JOIN MSG |
| REJECT | REPLY IF EXISTING MEMBER REJECTS JOIN MSG |
| LEAVE | SENT FROM EXISTING MEMBER TO ALL OTHER CONFERENCE MEMBERS TO TELL OF DEPARTURE |

*Fig. 4*

MECHANISM FOR CONTROLLING COMMUNICATION PATHS BETWEEN CONFERENCE MEMBERS

TECHNICAL FIELD

This document generally relates to computer-implemented conferencing systems, and more particularly, to decentralized multi-party conferencing systems.

BACKGROUND

Today, people commonly use messaging services over the Internet to communicate with each other. For example, a person may create a list of friends to whom they wish to communicate. Each friend has a unique user id that appears on the list. When the friend is online, the friend's user id is displayed in a manner such that the person knows the friend is available to communicate. The person may then initiate a "chat" session with the friend and exchange messages, commonly referred to as instant messages (IM). Additional friends may be added to the "chat" session resulting in a multi-party "chat" session having multiple people communicating with each other.

While having a multi-party "chat" session is convenient, users are becoming more interested in being able to see the other people and in experiencing a more "real-life" like experience, rather than typing messages. Unfortunately, providing a multi-party video conferencing system presents many challenges. One challenge is designing a system that can handle both the high bandwidth demand of the video conferencing application and the heterogeneity of Internet users. Another challenge is managing the communication among the multiple parties.

Many of the multi-party video conferencing systems only operate on a local area network (LAN). The following are a couple of multi-party video conferencing systems that operate over a LAN: 1) MERMAID described in an article by K. Watanabe et al. entitled "Distributed Multiparty Desktop Conferencing System: MERMAID" published in Proceedings of the Conference on Computer-Supported Cooperative Work, Los Angeles, Calif., September 1990; and 2) an article by Mike Macedonia and Don Bruzman entitled "MBONE, the Multicast Backbone" published in IEEE Computer, April 1994. Because these systems operate on a LAN, the bandwidth issue is not as problematic because the systems may utilize a multicast feature within the hardware to reduce the amount of data that is sent over the LAN. Unfortunately, the IP multicast enabled router is not universally deployed on the Internet.

Even though the hardware multicast feature is not universally deployed on the Internet, there have been some attempts at implementing a multi-party video conferencing system on a Wide Area Network (WAN). One system, commonly referred to as IVISIT produced by iVisit LLC in Santa Monica, Calif., is a server-based communication tool. IVISIT requires central servers that are accessible by the users at all times. The central servers perform membership registration and verification. Users interact with the central server when setting up their audio/video sessions with other users identified on their list of friends. While IVISIT allows a user to make multiple connections and view multiple videos at the same time, the system is not ideal. In one mode, the user must manually make each of the desired connections. In another mode, multiple parties may send instant messages to each other within a single chat room, but when video is desired, the video communication is based on an independent one-to-one connection. Thus, IVISIT does not provide the type of multi-party video conferencing system that the general public desires.

Another system, commonly referred to as WEBEX produced by WebEx Communication, INC. of San Jose, Calif., provides online meeting services for global businesses. The services include application sharing, white board, and video conferencing. WEBEX includes a number of switching centers worldwide for routing communications among the end users. While this strategy is efficient when there are a large number of simultaneous video conferences, WebEx is too costly for small-scale personal communications.

As described above, while having a server handle the communication is effective for large-scale enterprises, the server-based systems have several drawbacks for operating with small-scale personal communications. One drawback is the expense of purchasing and maintaining a server. Another disadvantage is the bottleneck created by using a central server. Thus, until now, there has not been a satisfactory solution for a multi-party video conferencing system suitable for use by the general public.

SUMMARY

The techniques and mechanisms described herein are directed to controlling communication paths between conference members in a decentralized multi-party conference that supports a full mesh architecture. Several check points are tested in order to handle concurrency issues and to ensure quality of service. First, a check is made to determine whether any pending communication paths exist between the two systems. Second, a check is made to determine whether one of the systems is in the process of leaving the multi-party conference. Third, a check is made to determine whether a maximum number of conference members already exist in the conference. Upon failing any of these checks, the communication path between the two systems fails. Upon success, the new system initiates the joining process with each of the other members in the conference in order to maintain the full mesh architecture.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 is a table illustrating a conference control protocol for establishing and maintaining the network shown in FIG. 2.

DETAILED DESCRIPTION

Briefly, the present mechanism provides a conference control protocol for establishing and maintaining a decentralized multi-party video conference system. The protocol utilizes several check points to handle concurrency issues and to ensure the quality of service. As will be described in detail below, the present conference control protocol operates effectively on different types of Internet connections, such as dial-up, broadband, cable, and the like. These and other advantages will become clear after reading the following detailed description.

Figure 1:
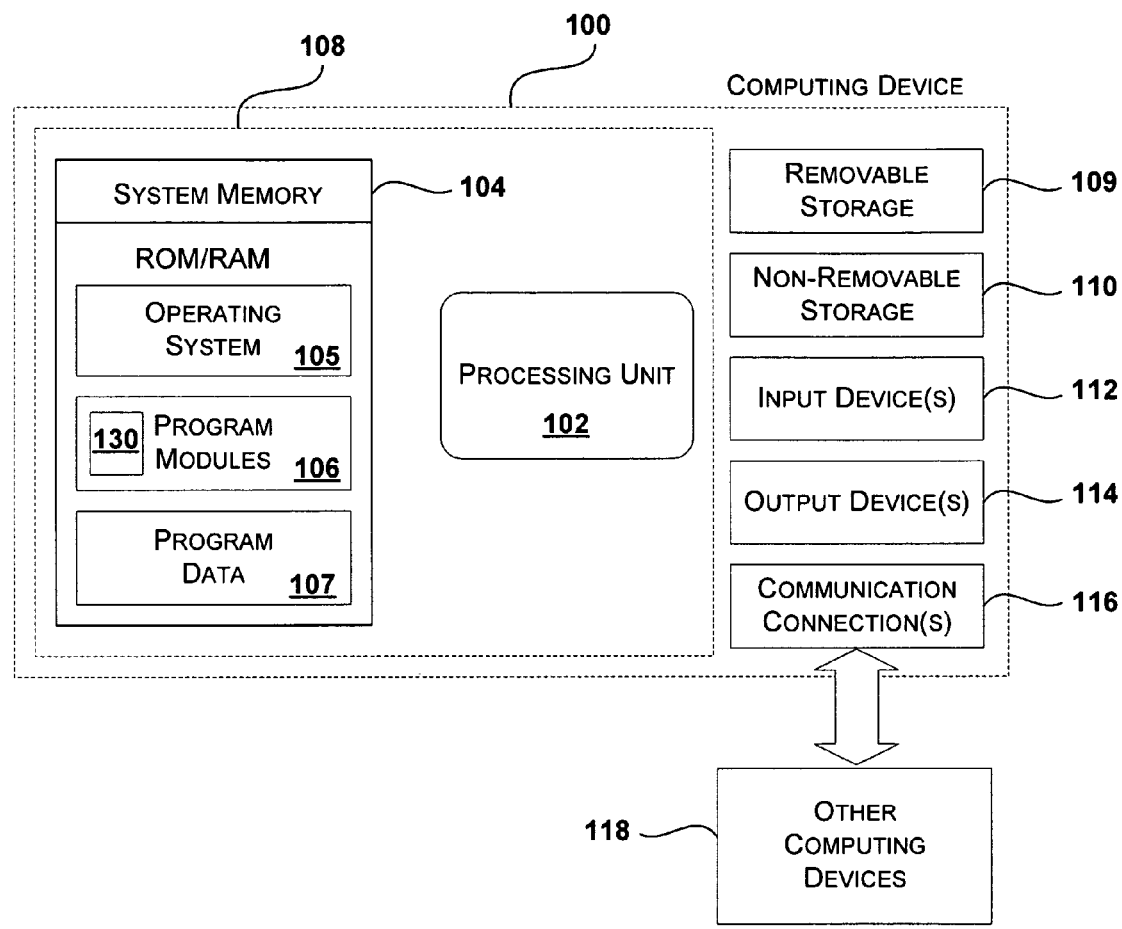
FIG. 1 is an illustrative computing device that may be used to implement the techniques and mechanisms described herein.

FIG. 1 illustrates one exemplary system for implementing the present decentralized video conferencing mechanism. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The program modules 106 include modules 130 for implementing the present decentralized multi-party conference mechanism. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Figure 2:
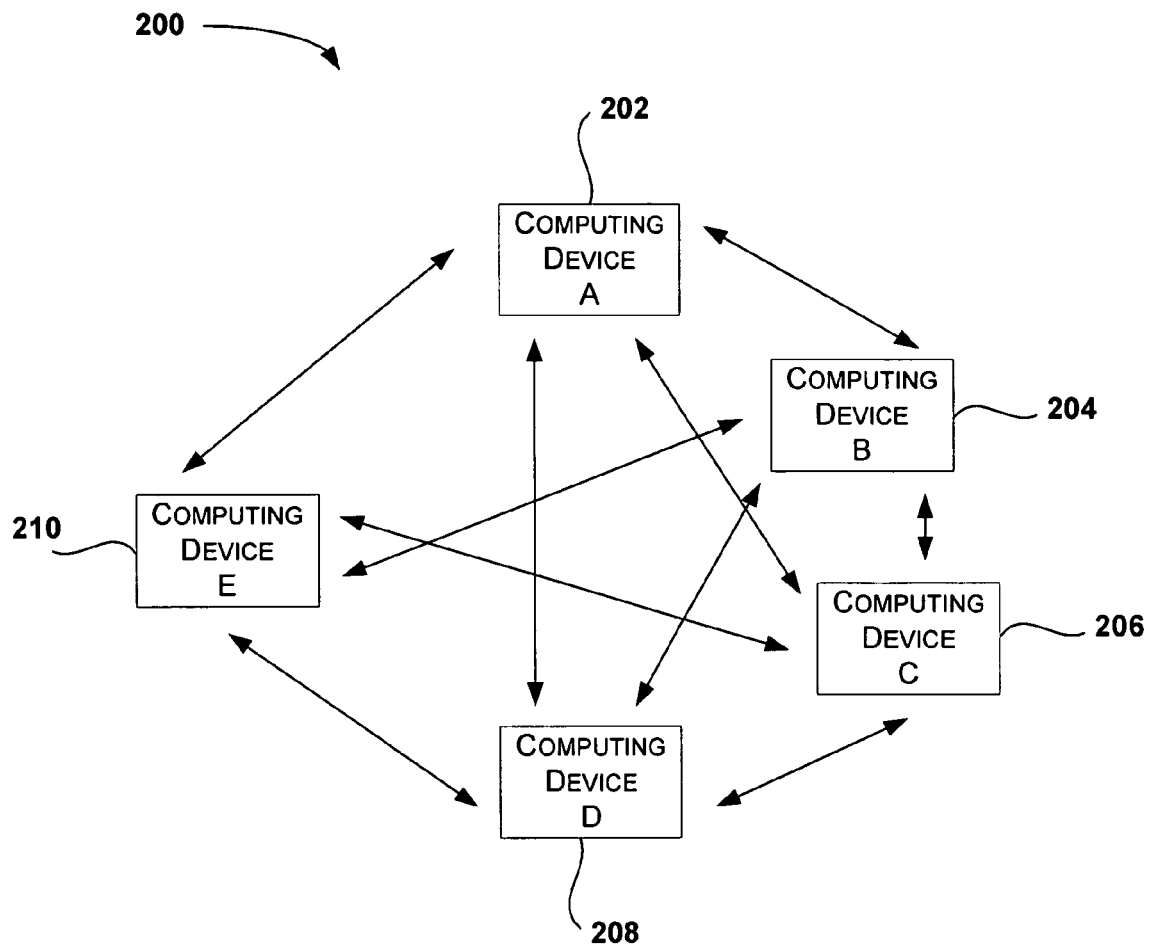
FIG. 2 is an illustrative network in which two or more computer devices shown in FIG. 2 may be configured.

FIG. 2 is an illustrative network in which two or more computer devices depicted in FIG. 1 may be configured. The network 200 is a distributed architecture using a full mesh conferencing architecture. Additional information describing a full mesh conferencing architecture may be obtained from an article written by J. Lennox and H. Schulzrinne, entitled "A protocol for reliable decentralized conferencing", In Proc of $13^{th}$ International Workshop on Network and Operating Systems Support for Digital Audio and Video, pp. 72-81, 2003, which is expressly incorporated herein by reference for all purposes. One will note that the above article states that the full mesh conferencing architecture described in the article is not suitable for bandwidth-limited end systems, such as wireless devices and users with 56 kbps modems. In contrast, the present conference control protocol overcomes this limitation. In addition, the present conference control protocol provides an efficient protocol that diminishes network cost during the connection process, provides a faster joining process, and reduces the chance of failure during the join process caused by transient network errors.

In general, in the full mesh conferencing architecture, each conference member (e.g., conference members 202-210) has a direct communication channel with each other conference member (represented by an arrow between two conference members). Each conference member 202-210 is a computing device, such as computing device 100 shown in FIG. 1. The conference members 202-210 utilize the present conference control protocol described herein for establishing and maintaining the full mesh conferencing architecture. As will be described in detail below, the present conference control protocol provides a simple conference control protocol that is suitable for small scale systems. Unlike prior multi-party video conferencing systems, the present architecture does not require a central server. Therefore, the drawbacks mentioned above with a central server are not applicable to the present architecture.

In the full mesh conferencing architecture 200, each conference member 202-210 has equal standing. Therefore, no conference member has special functionality or privileges in comparison with the other conference members. In addition, each conference member has the equal ability to invite a new user to the conference at any time. Similarly, each conference member may leave the conference at any time. Even though each conference member may invite additional users and leave at any time, the stability of the full mesh conferencing architecture 200 is maintained, as will be described in detail below.

Figure 3:
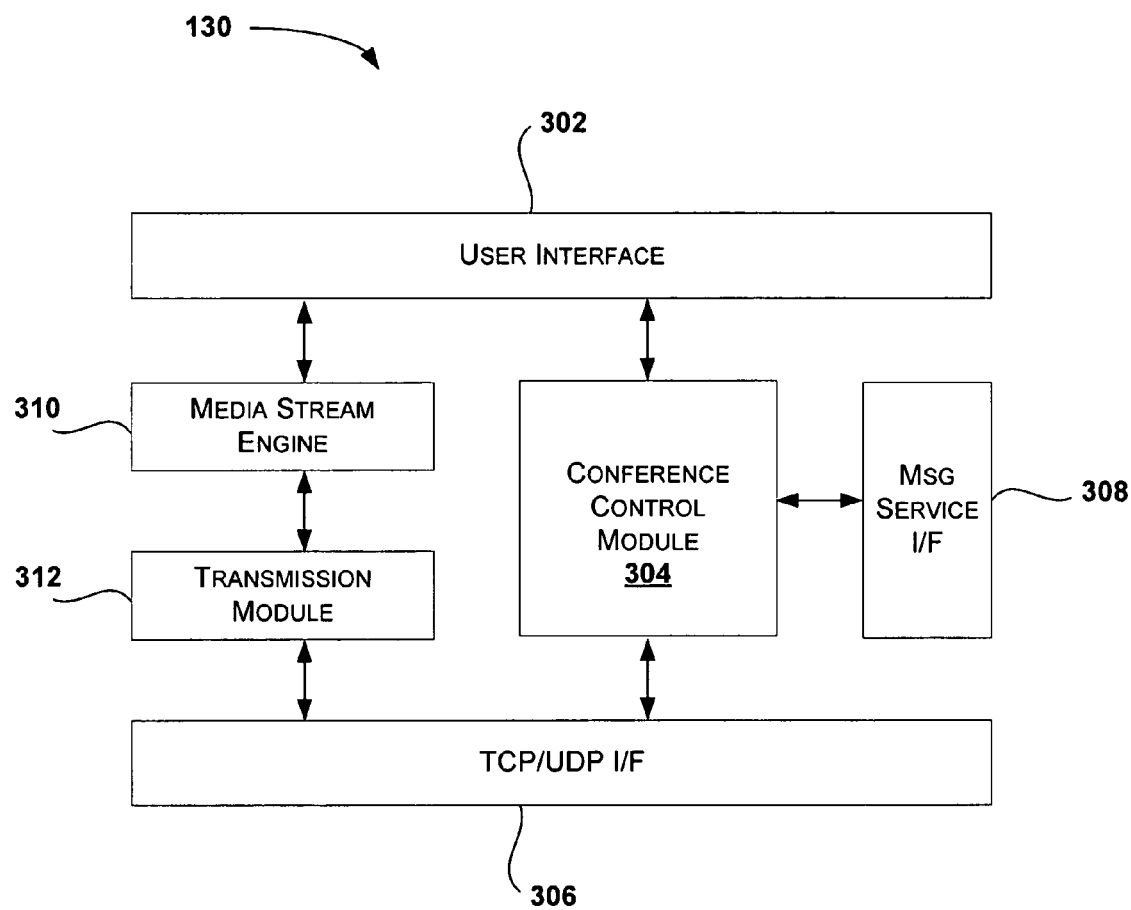
FIG. 3 is a functional block diagram that illustrates components within the computing device shown in FIG. 1 for implementing the techniques and mechanisms described herein.

FIG. 3 is a functional block diagram that illustrates one embodiment for modules 130 within the computing device 100 shown in FIG. 1 for implementing the techniques and mechanisms described herein. As one skilled in the art will appreciate, in some implementations, the entire functionality of one module or a portion of the functionality of one module may be incorporated within another module without departing from the scope of the claims below. The multi-party video conferencing system includes a user interface 302, a media stream engine 310, a transmission module 312, a conference control module 304, a messaging service interface 308, and a transmission control protocol (TCP)/user datagram protocol (UDP) interface 306.

The user interface 302 communicates with the media stream engine 310 and the conference control module 304. The media stream engine 310 communicates with the transmission module 312, which communicates with the TCP/UDP interface 306. The conference control module 304 communicates with a messaging service (not shown) through the messaging service interface 308. In addition, the conference control module 304 communicates with the other computing devices via the TCP/UDP interface 306. When the messaging service 308 utilizes an open programming interface, the conference control module 304 may communicate with the messaging service using standard programming techniques that are known to those skilled in the art.

The operation of the user interface 302, media stream engine 310, and transmission module 312 may occur in various manners without changing the manner in which the present conference control protocol operates. Therefore, the following describes one illustrative operation of these other modules and then describes the conference control module 304 in greater detail. With respect to the former, the user interface 302 handles user requests, such as turning the audio/video on and off during the conference, joining a conference, and leaving a conference. The media stream engine 310 captures the audio/video and plays the audio/video. The audio/video that is captured by the media stream engine 310 is transmitted by the transmission module 312 via the TCP/UDP interface to other conference members. The conference control module 304 handles the communication between the conference members when new users join and current members leave the mesh conferencing architecture. While the present description describes the mesh conferencing architecture and the conference control protocol with respect to a multi-party video conferencing system, the present mechanism described below may also be implemented in other environments, such as group text messaging and the like.

FIG. 4 is a table 400 illustrating message types for implementing the present conference control protocol, which is responsible for establishing and maintaining the mesh conferencing network shown in FIG. 2. As mentioned above, each conference member in the mesh conferencing network has a communication channel to each of the other conference members in the network. The table 400 has two columns; a first column 402 identifies the types of messages utilized by the conference control protocol. The second column 404 describes the actions associated with each type of message. As illustrated, the present conference control protocol is very concise and uses four message types: a JOIN message 410, an ACCEPT message 412, a REJECT message 414, and a LEAVE message 416. Because the present conference control protocol implements a concise protocol, the network costs during the connection set-up process is diminished, the process of joining members is faster, and the chance of a failure during the joining process due to transient network errors is reduced.

The JOIN message 410 is sent from a first computing device to another computing device to indicate the first computing device's desire to establish or join a multi-party conference. The ACCEPT message 412 is sent from the other computing device in response to the JOIN message 410 and indicates that the other computing device accepted the JOIN message 410. The REJECT message 414 is sent from the other computing device in response to the JOIN message 410 and indicates that the other computer device did not accept the JOIN message 410. As will be described below, in conjunction with FIG. 5, there are several scenarios in which the JOIN message is not accepted. The LEAVE message 416 is sent from a first computing device currently in a multi-party conference to other computing devices in the multi-party conference to indicate the first computing device's departure from the multi-party conference.

The present conference control protocol provides a quality of service (QOS) suitable for a multi-party video conferencing system. It achieves this quality of service by imposing requirements (e.g., check points) during the join and leave processes. In general, the check points ensure that concurrency issues are handled in a manner such that the mesh conference architecture is not compromised. Concurrent actions are actions performed by one existing member when the conference is an unstable state caused by the actions of another existing member. Thus, concurrency does not necessarily mean exactly coincident.

Figure 5:
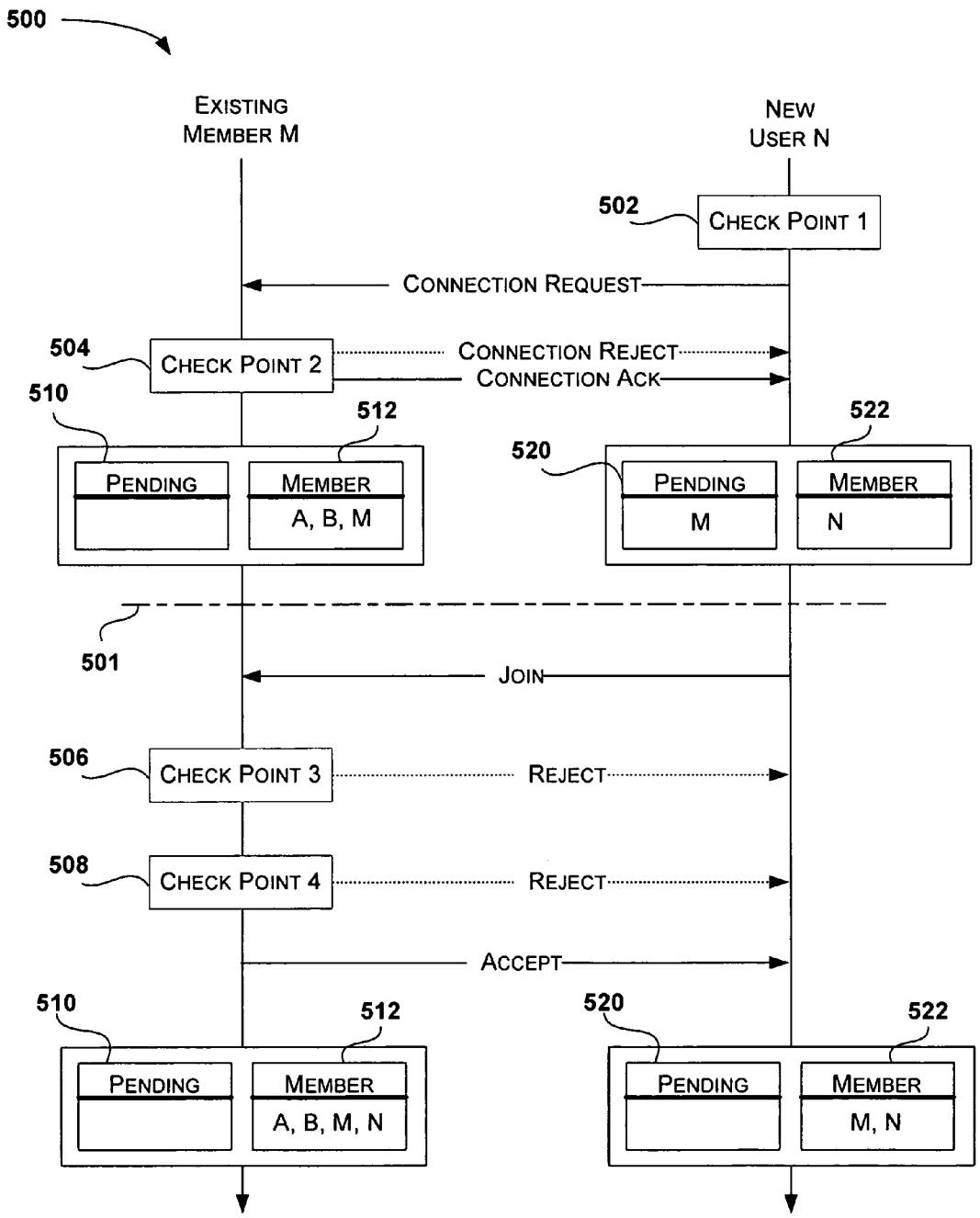
FIG. 5 is a sequential flow diagram illustrating the operation of the conference control protocol when adding a new user into the network shown in FIG. 2.

FIG. 5 is a sequential flow diagram illustrating the operation of the conference control protocol during a join process 500 that adds a new user to the mesh conference network shown in FIG. 2. The join process 500 is performed for each connection that is needed in order to keep the full mesh architecture complete. The new user that is invited is responsible for building each of the required communication channels. For example, if there are currently three existing members, the new user will perform the join process 500 three times, one for each of the existing three members. The actions above the dotted dash line 501 represent the processing that is needed to create a TCP connection. The actions below the dotted dash line 501 represent the processing that is needed to create a communication dialog. The communication dialog is then used for sending conference control messages, such as the subscription request to the audio/video stream of an existing conference member.

The join process 500 includes four check points 502, 504, 506 and 508. As will be described below, if any of these check points fail, the join process 500 will terminate and the new user will not be able to join the conference. The line on the left of the diagram represents an existing member (e.g., member M) in the multi-party video conference. The line on the right of the diagram represents a new user (e.g., new user N) that desires to become a member of the multi-party video conference. At some time, before the new user N sends the CONNECTION REQUEST message, new user N becomes aware of the multi-party video conference. The new user N may become aware of the multi-party video conference through an Internet instant message (IM) sent via an Internet messaging service from existing member M. The Internet messaging service may be one of several well known messaging services. These messaging services are well known in the art and need not be discussed at length here, except to the extent necessary to describe the interaction with the present conference control protocol. The Internet message includes an IP address, which the new user N utilizes through-out the join process 500. In addition, the instant message may include a unique conference ID. Once the new user N becomes aware of the multi-party conference and has been invited to join the conference, the conference control protocol is begun. In the above example, the new user N may initiate joining the conference by clicking on a link provided within the instant message.

At check point 502, the new user N determines whether an instance of the multi-party video conference modules, shown in FIG. 3, has previously been loaded on the computing device associated with the new user N. If the multi-party video conference modules have not been previously loaded, they are loaded at this time so that processing may continue. Once the multi-party video conference modules are loaded and available for execution, the new user N sends a CONNECTION REQUEST message to existing member M according to the IP address received from an out-of-band mechanism, such as the instant message that invited the new user N to the conference. This CONNECTION REQUEST message initiates the building of the TCP connection channel between the existing member M and the new user N. Processing continue to check point 504.

At check point 504, the existing member M performs a concurrency check that prevents two communication channels from being built between the same two computing devices. While two communication channels do not harm the full mesh architecture, each communication channel uses resources, which ultimately wastes resources by not allowing them to be used by other computing devices. Therefore, having two communication channels is undesirable.

The present conference control protocol implements a pending list (e.g., pending list 510 and 520), along with a member list (e.g., member list 512 and 522), on each of the computing devices in order to prevent duplicate communication channels. While the pending lists 510 and 520 and member lists 512 and 522 are illustrated as separate lists, one skilled in the art will appreciate that a computing device may have one list that includes the necessary information for both the pending list and the member list. The pending lists 510 and 520 are updated on the computer device that sends the CONNECTION REQUEST when the CONNECTION REQUEST message is sent.

Thus, referring to FIG. 5, pending list 520 is updated when new user N sends the CONNECTION REQUEST. As shown, existing member M is listed in the pending list 520 that is associated with the new user N. The member list 522 is updated when a computing device loads the multi-party video conference modules to reflect that computing device as being a member. Thus, the top member list 522 reflects new user N as being a member. One will note that existing member M also has a pending list 510. Pending list 510 lists the computing devices to which existing member M has sent a CONNECTION REQUEST. In the example flow illustrated in FIG. 5, existing member M has not sent a CONNECTION REQUEST to new user N, so new user N is not in the pending list 510. The unique identification of the computing device to which the CONNECTION REQUEST was sent is added to the pending list 520 to identify the member.

Thus, at check point 504, when existing member M receives the CONNECTION REQUEST from new user N, existing member M checks its pending list (e.g., pending list 510). If the new user N is not in the pending list 510, existing member M sends a CONNECTION ACKNOWLEDGE (ACK) message to the new user N. However, if the new user N is already in the pending list, existing member M compares the identification for the new user N in the pending list with the identification for the new user N received from the CONNECTION REQUEST message. Based on this comparison, existing member M will either send a CONNECTION REJECT message or a CONNECTION ACK message to new user N. In one implementation, the comparison involves comparing the dotted IP address for the new user N. In this implementation, the CONNECTION ACK is sent when the dotted IP address for the computing device is larger than the local ID stored in the pending list. Thus, by performing check point 504, a redundant path between member M and new user N is not established.

If new user N receives the CONNECTION ACK message, this signals that the TCP connection is now established. New user N then sends a JOIN message to existing member M. Existing member M performs another verification (see Check Point 506). At check point 506, a presence flag is checked to determine whether the existing member M is actually in the process of leaving the conference. As will be described below in conjunction with FIG. 6, when an existing member M attempts to leave, the existing member M sets a presence flag to indicate that wish. Thus, at check point 506, existing member M checks its presence flag to determine whether or not to reject the JOIN messages received from new user N. Existing member M will reject the JOIN message, if the presence flag indicates that it is in the process of leaving the conference. Otherwise, existing member M will proceed to check point 508.

At check point 508, the existing member M checks its member list 512 and pending list 510 to determine whether the conference can add another member. The number of members that can be in communication with each other in a multi-party video conferencing system is chosen to provide the maximum connectivity for users while not degrading the quality of service under current bandwidth condition of the Internet. In one embodiment, this limit of conference members is defaulted to five. In another embodiment, the maximum number of conference members is configurable by a conference initiator (i.e., the user that sends the first CONNECTION REQUEST message for the conference). If the pre-determined number of conference members has already been reached, the JOIN message fails and new user N does not get included into the mesh architecture. However, if the check point 508 passes, the existing member M sends an ACCEPT message to the new user N. The ACCEPT message identifies all the conference members (e.g., members A, B, M, and N) currently in the multi-party conference as viewed by existing member M. One will note that at this point, existing member M views new user N as being a member and includes new user N in the member list 512. Once this is completed, a communication dialog is available between existing member M and new user N, until one of them leaves.

When new user N receives the ACCEPT message, new user N moves existing member M from the pending list 520 to the member list 522. New user N is then responsible for performing the join process 500 for each of the members that are identified within the ACCEPT message (e.g., members A and B). Members A and B will not be added to the pending list 522 until new user N sends a CONNECTION REQUEST message to them.

Figure 6:
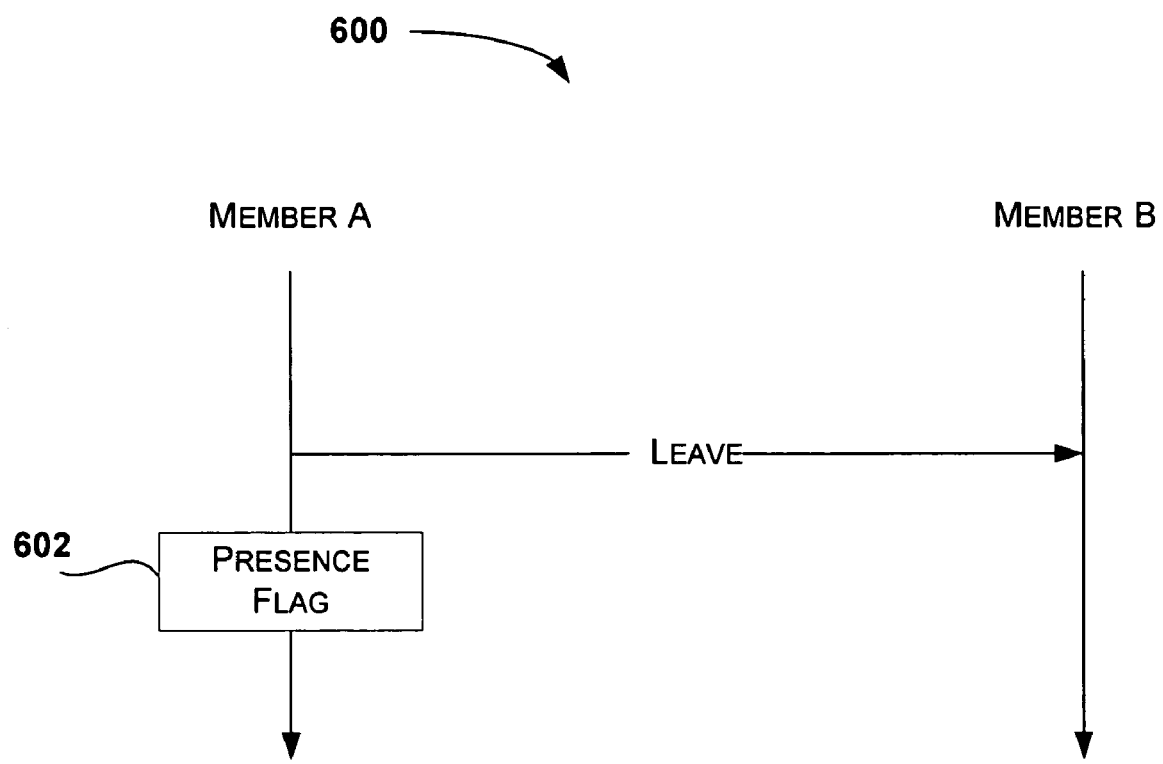
FIG. 6 is a sequential flow diagram illustrating the operation of the conference control protocol when a member leaves the network shown in FIG. 2.

FIG. 6 is a sequential flow diagram illustrating the operation of the conference control protocol during a leave process 600 for removing a member from the mesh conference network shown in FIG. 2. For the leave process 600, the leaving member (e.g., member A) sends a LEAVE message to each of the other existing members (e.g., member B) in the conference. Thus, leave process 600 is performed once for each of the existing members. After at least one of the LEAVE messages, preferably, after the first leave message is sent, the leaving member A updates its presence flag to indicate that it is in the process of leaving the conference. As was described above, the join process 500 utilizes this presence flag during check point 506 to ensure that a leaving member is not "forced" to re-join.

The significance of each of the check points 502-506 during the join process 500 shown in FIG. 5, in conjunction with the leave process 600 shown in FIG. 6, may be best understood by describing some example scenarios.

With reference to check point 502, check point 502 ensures that only one instance of the decentralized multi-party program modules is loaded in any one computing device. Check point 502 is instrumental in handling situations in which a user leaves a conference shortly before the user decides to re-join. In this situation, it is possible that the JOIN message may outrace the LEAVE message. Without check point 502, if this would occur, other members may ignore the first arrived JOIN message and close the connection when the LEAVE arrives. This is a very undesirable result. However, by performing check point 502, the existing member that receives the JOIN message from a member that is already on its member list will close the previous connection and accept the current request.

With reference to check point 504, check point 504 ensures that only one communication channel exists between two members. There is a possibility for two communication channels to be built between the same computing devices when two existing conference members (e.g., conference members A and B) each invite a different new user (e.g., new user C and D), respectively. When implementing the mesh conferencing network, when conference member A invites new user C to the conference, conference member A will inform new user C that members A and B are currently existing members. Likewise, when conference member B invites new user D to the conference, conference member B will inform new user D that A and B are members. When member C begins the join process with member B, at the end, member B will inform member C that A, B, and D are members. Likewise, when member D begins the join process with member A, at the end, member A will inform member D that A, B, and C are members. Thus, both members C and D will initiate the join process for establishing a communication dialog between each other. Check point 504 ensures that the only one of these communication dialogs will be established.

With reference to check point 506, check point 506 ensures that a member that is leaving is not forced to rejoin the conference in order to maintain the full mesh conference architecture. For example, assuming that there are three members (members A, B, and C) in a multi-party conference. Member A wishes to leave the multi-party conference and sends a LEAVE message to both members B and C. While member A is in the process of leaving, member B invites member D to the multi-party conference. In this situation, A may receive member D's CONNECTION REQUEST before successfully leaving the multi-party conference. Without check point 506, member A would re-join the conference in response to D's CONNECTION REQUEST. However, by utilizing the present flag when leaving, at check point 506, A determines that it is in the process of leaving and sends a REJECT message to new user N.

With reference to check point 508, check point 508 ensures that the quality of service is maintained for any multi-party conference. By restricting the number of users to a pre-determined number, the conference control protocol does not allow the conference to get too large and jeopardize the quality of service. The earlier members have priority over members that join later.

It is important to note, that in certain situations, new user N has already been accepted as a new member and may already appear in the member list on some computing devices. If new user N receives the CONNECTION REJECT message from a different existing member, the join process 500 fails and new user N does not join the conference. Thus, the new user N must send LEAVE messages to all the existing conference members with whom the connection has already been established.

While the verification of any conference control protocol is difficult, the verification of the present multi-party conference control protocol is even more difficult because the protocol behavior depends heavily on the order in which events occur, and the possible orders are, in fact, exponential to the size of the conference and the number of actions. Knowing this, the validation of the present multi-party conferencing protocol was performed by validating the operation of the protocol in all possible concurrent scenarios. As mentioned above, the stability of the mesh conference architecture must always be protected, even though members may concurrently join and leave. Concurrent joining and leaving may occur with two different members or may occur with the same member.

Therefore, four types of events were defined and validated. The four events, shown in the Table below, include JOIN (J), LEAVE (L), BRIEF JOIN (BJ), and BRIEF LEAVE (BL). JOIN and LEAVE are explained above. BRIEF JOIN refers to the situation in which a member joins and then immediately leaves. BRIEF LEAVE refers to the situation in which a member leaves and then immediately re-joins. Based on these four events, the present conference control protocol was tested. The results of the test are illustrated in Table 1.

TABLE 1

| Test | Initial State | Action | Final State |
| --- | --- | --- | --- |
| 1 | (A, B, C, D) | J(E, F) | (A, B, C, D, E) |
|   |              |         | (A, B, C, D, F) |
|   |              |         | (A, B, C, D) |
| 2 | (A, B, C, D) | L(C, D) | (A, B) |
| 3 | (A, B, C, D) | BJ(E) | (A, B, C, D) |
| 4 | (A, B, C, D) | BL(D) | (A, B, C) |
| 5 | (A, B, C) | J(D), L(C) | (A, B, D) |
| 6 | (A, B, C) | J(D), BJ(E) | (A, B, C, D) |
| 7 | (A, B, C) | J(D), BL(C) | (A, B, C, D) |
| 8 | (A, B, C, D) | L(D), BJ(E) | (A, B, C) |
| 9 | (A, B, C, D) | L(D), BL(C) | (A, B, C) |
| 10 | (A, B, C, D) | BJ(E), BL(D) | (A, B, C, D) |
| 11 | (A, B, C) | J(D), L(C), BJ(E) | (A, B, D) |
| 12 | (A, B, C, D) | J(E), L(D), BL(C) | (A, B, C, E) |
| 13 | (A, B, C) | J(D), BJ(E), L(C) | (A, B, D) |
| 14 | (A, B, C, D) | L(D), BJ(E), BL(C) | (A, B, C) |
| 15 | (A, B, C) | J(D), L(C), BJ(E), BL(B) | (A, B, D) |

As illustrated in Table 1, fifteen scenarios were tested. Each row represents on of the test scenarios. The initial state identifies existing members of the conference. The action column identifies the actions JOIN (J), LEAVE (L), BRIEF JOIN (BJ), and BRIEF LEAVE (BL) that have occurred concurrently. For example, in test 1, both E and F have sent JOIN messages. The final state column identifies the final state which should result. Typically, there is just one acceptable final state. However, in test 1, because the present conference protocol limits the number of members to five, only one of the two joiners is allowed to attend or alternatively, neither is allowed to join. Because the information in Table 1 is self-explanatory, further analysis of Table 1 is not described. It is important to note that the present conference protocol passed each of the fifteen tests and every conference member stabilized with exactly one single active communication channel with each of the other members.

The present multi-party video conferencing system also provides security protection. In one embodiment, the security protection involves assigning a unique 128-bit conference ID to each conference. The 128-bit conference ID is similar to a Global Unique Identifier (GUID). The conference ID is generated by the conference initiator, the one who invites a new user to attend the conference. Each invitation to the same conference will have the same conference ID within the instant message. The conference ID is then sent with the JOIN message in order to identify the conference and to ensure that the new user has been appropriately invited to the identified conference.

Thus, as described, the present conference control protocol for multi-party video conferencing systems operates using networked computers configured in a full mesh conference architecture. Thus, the costs and drawbacks associated with having one or more central servers are avoided. The present conference control protocol provides a reliable, flexible alternative for multi-party video conferences which is also lower in cost.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for controlling communication paths between conference members in a decentralized multi-party conference supporting a full mesh architecture, the method comprising:
   receiving a connection request message in a first system, the connection request message being sent from a second system;
   determining whether a pending communication path exists between the first and second system, in response to the connection request message;
   sending a connection acknowledgement to the second system, if no pending communication path exists between the first and second system, to establish a connection path between the first and the second system;
   receiving at the first system a join message from the second system;
   determining, by reading a flag in the first system in response to the join message, whether the first system is in a process of leaving the multi-party conference since establishing the connection path between the first and the second system;
   sending from the first system to the second system in response to the determining, an accept message to establish a video communication channel between the first and second system, if the first system is not in a process of leaving the multi-party conference, the accept message containing member information identifying other conference participants currently in the multi-party conference; and
   automatically sending a reject message from the first system to the second system, in response to the determining, if the first system is in a process of leaving the multi-party conference since establishing the connection path between the first and the second system.

2. The method of claim 1, further comprising transferring video data over the video communications channel between the first and second system once the video communication channel between the first and second system is established.

3. The method of claim 1, wherein the member information includes the second system as one of the conference members.

4. The method of claim 1, wherein the first system determines whether there is a pending communication path between the first and second system by checking a pending list on the first system, the pending list stores identifiers for each of the systems to which the first system has already sent a previous connection request message.

5. The method of claim 1, wherein the first system determines that it is not in the process of leaving by checking a presence flag on the first system, the presence flag being updated when a leave message is sent from the first system.

6. The method of claim 1, wherein sending the join accept message is based on determining that the conference does not already have a maximum number of conference members.

7. The method of claim 6, wherein the maximum number of conference members is configurable by a conference initiator.

8. The method of claim 6, wherein the maximum number is based on current Internet bandwidth conditions.

9. The method claim 6, wherein the determining that the conference does not already have a maximum number of conference members comprises comparing the number of members listed in both a member list and a pending list with the maximum number of conference members.

10. The method of claim 6, wherein the maximum number is a default value.

11. The method of claim 1, further comprising sending an internet instant message to the second system to invite the second system to become a member of the conference and to initiate the joining process by sending the connection request message.

12. The method of claim 11, wherein the internet instant message includes a conference identifier.

13. The method of claim 12, wherein the connection request message and the join message include the conference identifier.

14. A computer-readable storage medium having computer-executable instructions for performing the processing recited in claim 1.

15. A method for controlling communication paths between conference members in a decentralized multi-party conference supporting a full mesh architecture, the method comprising:

sending a connection request message from a first system to a second system, the second system being an existing member of the multi-party conference;

receiving a connection acknowledgment from the second system;

updating a pending list on the first system with an identifier associated with the second system to indicate that a communication path with the second system is pending in response to the connection acknowledgment received from the second system, the pending list being used to prevent duplicate channels from being established between the first and second system;

sending a join message from the first system to the second system to initiate an establishment of a video communication channel between the first and second system;

receiving an accept message from the second system indicating that the video communication channel between the first and second system is established, the accept message containing information identifying a third conference participant to the multi-party conference and a maximum number of conference participants;

updating the pending list on the first system to indicate that the communication path with the second system is no longer pending, to indicate the maximum number of conference participants, and to indicate the identity of the third conference participant, based on the information contained in the received accept message;

sending a connection request message from the first system to the identified third system in the pending list, the third system being an existing member of the multi-party conference;

receiving a connection acknowledgment from the third system;

updating the pending list on the first system with an identifier associated with the third system to indicate that a communication path with the third system is pending in response to the connection acknowledgment received from the third system;

sending a join message from the first system to the third system to establish a video communication channel between the first and third system;

receiving a Reject message from the third system indicating that the video communication channel between the first and third system is not established; and sending, in response to the first system receiving the Reject message, a leave message from the first system to the second system to remove the communication path between the first and second system.

16. The method of claim 15, wherein the accept message includes a member list that identifies conference members currently in the multi-party conference.

17. The method of claim 16, wherein the first system initiates a join process with each of the conference members identified within the member list by sending each conference member a separate connection request message, thereby maintaining the full mesh architecture of the decentralized multi-party conference.

18. The method of claim 15, further comprising receiving an internet instant message from the second system that invites the first system to become a member of the conference and to initiate the joining process by sending the connection request message.

19. The method of claim 15, wherein the first system receives the connection acknowledgment from the second system upon a determination by the second system that no pending communication path currently exists between the first system and the second system.

20. The method of claim 19, wherein the connection request message and the join message include the conference identifier.

21. A computer-readable storage medium having computer-executable instructions for performing the processing recited in claim 15.

22. A first computing device comprising:

a processor; and a memory into which one or more program modules are loaded, the programs modules responsible for controlling a decentralized multi-party conference using a mesh architecture, the program modules comprising:

a conference control module that supports a conference control protocol having:

sending a connection request message to a second computing device for seeking permission to join a multi-part conference with the second computing device;

receiving a connection acknowledgement message from the second computing device for approving the connection request message and updating a pending list in the first computing device;

sending a join message to the second computing device to initiate a communication path between the first and the second communications device; and receiving a join accept message containing one or more addresses of other computing devices in the multi-party conference and for finalizing the communication path between the first and second computing devices;

using one or more of the addresses in the join accept message to establish a communications path between the first computing device and other computing devices in the multi-party conference; and sending a leave message from the first communications device to the second and other computing devices to remove the first communications device from the multi-party conference.

23. The first computing device of claim 22, wherein the pending list is updated when the connection acknowledgement message is sent to an existing system by adding an identifier for the existing system to the pending list.

24. The first computing device of claim 23, wherein updates to the pending list occur based on the connection acknowledgement message and a connection reject message.

25. The first computing device of claim 22, wherein the conference control module further supports maintaining a member list, the member list lists each conference member in the multi-party conference, the member list is updated upon receiving a leave message or upon receiving the join accept message that finalizes the communication path.

26. The first computing device of claim 22, wherein the conference control module further supports maintaining a presence flag that indicates whether a system is in the process of leaving the multi-party conference, the present flag being updated in association with the leave message.

27. The first computing device of claim 22, wherein the program modules further comprise a user interface that is configured to handle user requests for joining or leaving the multi-party conference.

28. The first computing device of claim 22, wherein the program modules further comprise a messaging service interface that allows the conference control module to communicate with a messaging service.

29. The first computing device of claim 28, wherein the user interface is configured to receive an instant message from the messaging service, the instant message inviting a system to initiate the conference control protocol.

* * * * *